US012645201B2

(12) United States Patent
Klang et al.

(10) Patent No.: US 12,645,201 B2
(45) Date of Patent: Jun. 2, 2026

(54) METHOD TO CONFIGURE A SYSTEM FOR CHEMICAL SEPARATION

(71) Applicant: Cytiva Sweden AB, Uppsala (SE)

(72) Inventors: Hakan Klang, Uppsala (SE); Daniel Landby, Uppsala (SE); Dave J. Pazzani, Marlborough, MA (US)

(73) Assignee: Cytiva Sweden AB, Uppsala (SE)

( * ) Notice: Subject to any disclaimer, the term of this patent is extended or adjusted under 35 U.S.C. 154(b) by 913 days.

(21) Appl. No.: 17/864,036

(22) Filed: Jul. 13, 2022

(65) Prior Publication Data

US 2024/0019843 A1     Jan. 18, 2024

(51) Int. Cl.
| | |
|---|---|
| *G05B 19/4155* | (2006.01) |
| *G01N 30/86* | (2006.01) |
| *G01N 30/88* | (2006.01) |

(52) U.S. Cl.
CPC ..... *G05B 19/4155* (2013.01); *G01N 30/8662* (2013.01); *G01N 30/8696* (2013.01); *G01N 30/88* (2013.01); *G01N 2030/8881* (2013.01); *G05B 2219/32287* (2013.01)

(58) Field of Classification Search
CPC ........... G01N 30/8662; G01N 30/8696; G05B 19/4155; G05B 2219/32287
See application file for complete search history.

(56) References Cited

U.S. PATENT DOCUMENTS

| | | | | |
|---|---|---|---|---|
| 4,674,323 A * | 6/1987 | Rulf | ....................... | G01N 30/88 |
| | | | | 702/25 |
| 11,042,841 B2 * | 6/2021 | Ursitti | ..................... | G06F 16/34 |
| 11,899,000 B2 * | 2/2024 | Beals | ................. | G01N 30/8675 |
| 2007/0143042 A1 | 6/2007 | Stewart et al. | | |
| 2015/0293064 A1 * | 10/2015 | Aota | ................. | G01N 30/8658 |
| | | | | 73/61.52 |
| 2018/0364205 A1 | 12/2018 | Beals et al. | | |

FOREIGN PATENT DOCUMENTS

| | | |
|---|---|---|
| DE | 102020108696 A1 | 5/2020 |
| EP | 0359319 A2 | 9/1989 |

OTHER PUBLICATIONS

International Search Report and Written Opinion issued in international application No. PCT/EP2023/068458, mailed Oct. 18, 2023 (14 pages).

* cited by examiner

*Primary Examiner* — Shogo Sasaki
(74) *Attorney, Agent, or Firm* — Eversheds-Sutherland (US) LLP

(57) ABSTRACT

The present invention relates to a method performed by a system (110) operable to configure a chemical separation system (120), the method comprising: receiving system hardware configuration data, wherein the system hardware configuration data is at least indicative of fluid manipulation modules (121_1-12N_M) of the chemical separation system (120), desired functionality of the fluid manipulation modules, and a fluid network (210) comprising fluid couplers configured to fluidly couple the fluid manipulation modules (121_1-12N_M), identifying a first set of function blocks to provide the indicated fluid manipulation modules with the desired functionality, generating a second set of function blocks by purging a third set of function blocks from the first set of function blocks to eliminate dead code using the configuration data, sending the second set of function blocks to the system (120).

6 Claims, 8 Drawing Sheets

500

510: receiving system hardware configuration data

520: identifying a first set of function blocks to provide the indicated fluid manipulation modules with desired functionality 530: generating a second set of function blocks by purging a third set of function blocks from the first set of function blocks to eliminate dead code using the configuration data 540: sending the second set of function blocks to the chemical separation system

100

120
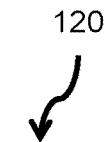
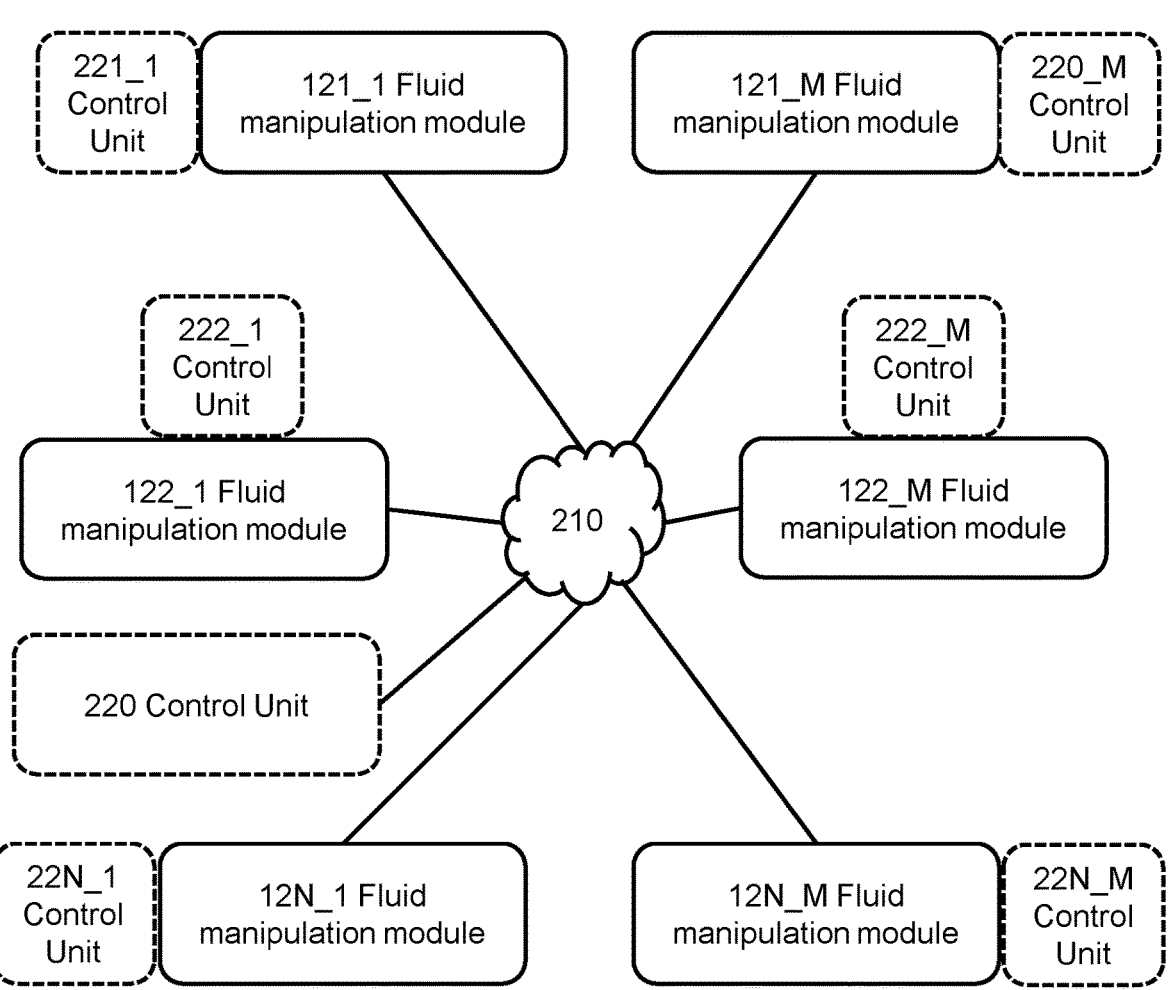
Fig. 2

| Device ID | Module ID | Version |
|-----------|-----------|---------|
| 120A | 121_1 | 3.2 |
| 120B | 121_1 | 3.1 |
| ... | ... | ... |

500

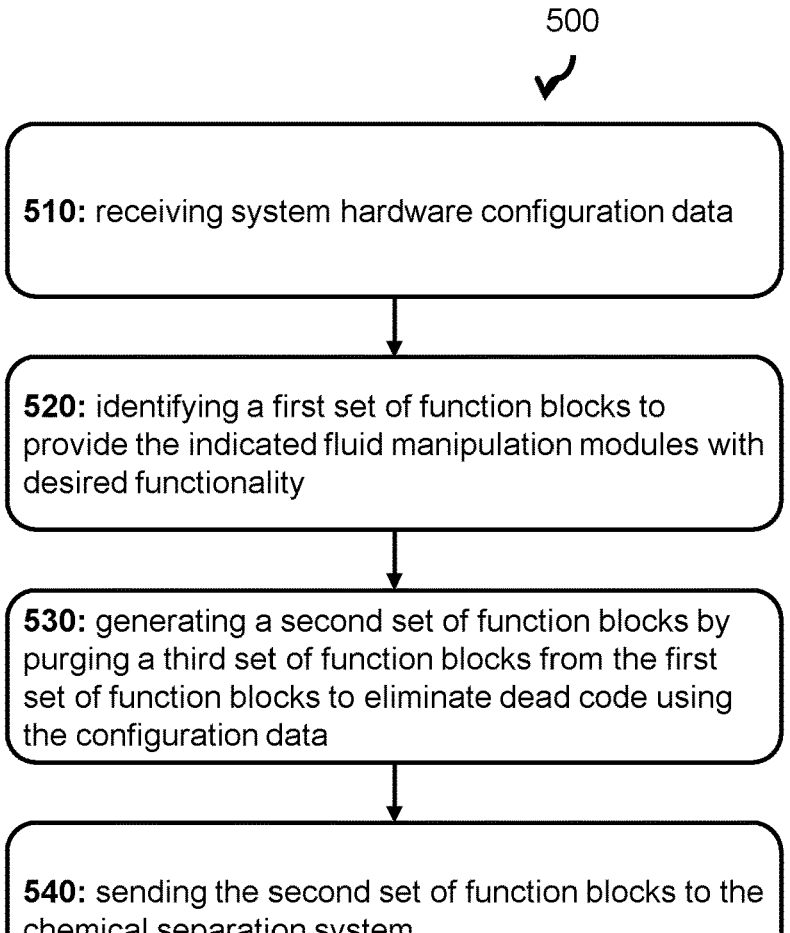

510: receiving system hardware configuration data

520: identifying a first set of function blocks to provide the indicated fluid manipulation modules with desired functionality

530: generating a second set of function blocks by purging a third set of function blocks from the first set of function blocks to eliminate dead code using the configuration data

540: sending the second set of function blocks to the chemical separation system

Fig. 5

METHOD TO CONFIGURE A SYSTEM FOR CHEMICAL SEPARATION

TECHNICAL FIELD

The present invention relates to a method to configure a system for chemical separation.

BACKGROUND

To efficiently perform chemical separation, such as in liquid chromatographic separation, a system must be configured to support a desired chromatographic process. This involves cumbersome and time-consuming manual work.

Typically, a number of fluid manipulation modules are selected and fluidly coupled via a fluid network. By combining different fluid manipulation modules, different functionality can be enabled and/or achieved.

In one example, addition of a fluid manipulation modules in the form of a pump and a conductivity sensor enables performing chemical separation with a gradient based on conductivity. I.e., the functionality associated to a particular fluid manipulation module is in part dependent on the selection of further fluid manipulation modules.

A subset of the fluid manipulation modules each includes a control unit, such as a programmable logic controller, PLC. The software required to provide a desired functionality of a fluid manipulation module will therefore vary depending on the selection of further fluid manipulation modules.

In conventional solutions, an expert system may be used to generate a configuration and identify the fluid manipulation modules, desired functionality and the fluid coupling/s required. The chemical separation device or system is then assembled according to the configuration. Software, often in the form of functional blocks for a PLC, is the loaded into control units of fluid manipulation modules in the assembled chemical separation device or system.

This has the drawback that software supporting all of the functionality that a particular fluid manipulation module is capable to provide, is loaded into a respective control unit. To include software that is not used, but that still can be executed by mistake, greatly increases the risk of production errors and reduces overall safety.

Thus, there is a need for an improved method for configuring a device or system for chemical separation. In particular. In particular, for configuring software of the device or system.

OBJECTS OF THE INVENTION

An objective of embodiments of the present invention is to provide a solution which mitigates or solves the drawbacks and problems described above.

SUMMARY OF THE INVENTION

The above and further objectives are achieved by the subject matter described herein. Further advantageous implementation forms of the invention are further defined herein.

According to a first aspect of the invention, the above mentioned and other objectives are achieved by a method performed by a system operable to configure a chemical separation system, the method comprising receiving system hardware configuration data, wherein the system hardware configuration data is at least indicative of fluid manipulation modules of the chemical separation system, desired functionality of the fluid manipulation modules, and a fluid network comprising fluid couplers configured to fluidly couple the fluid manipulation modules, identifying a first set of function blocks to provide the indicated fluid manipulation modules with the desired functionality, generating a second set of function blocks by purging a third set of function blocks from the first set of function blocks to eliminate dead code using the configuration data, sending the second set of function blocks to the system.

In one embodiment according to the first aspect, generating the second set of function blocks comprises mapping the desired functionality to respective function blocks comprised in the first set of function blocks and identifying the third set of function blocks as blocks comprised in the first set of function blocks that have not been mapped to the desired functionality.

In one embodiment according to the first aspect, the method further comprises storing data related to the chemical separation system by storing identities of the chemical separation system, storing identities of function blocks in the second set of function blocks, storing version identity of said function blocks in the second set of function blocks and storing identity of the fluid manipulation modules, to which each function block of the second set of function blocks is associated to, in a database.

In one embodiment according to the first aspect, the function blocks are function blocks defined by the IEC 61131-3 standard.

In one embodiment according to the first aspect, the system hardware configuration data is indicative of fluid manipulation modules selected from one or more of inlet port modules, system pump modules, pressure sensor modules, mixer modules air trap modules, conductivity modules column modules, UV modules, pH modules and outlet modules.

In one embodiment according to the first aspect, the system hardware configuration data is at least indicative of a flow scheme for directing fluids to and from the system and for operating said fluid manipulation modules of the system according to a selected protocol.

Advantages of the disclosure according to the first aspect are at least that a fully automated creation of an instrument configuration, IC, for a specific chemical separation system configuration is achieved. This is an improvement of the conventional solutions including a manual or semi manual process. A further advantage is that manual intervention is reduced and thereby reducing the risk of introduction of bugs or fixes by ensuring that a well-defined reproducible process for IC-generation of every customer specific system configuration is achieved. A further advantage is that dead code is eliminated, by purging function blocks supporting functionality that is not part of desired functionality. I.e., a particular fluid manipulation module may support more functionality than what is desired, and software supporting that functionality is purged before being loaded into the respective fluid manipulation module. A further advantage is that the resulting IC is reproducible and is generated in the same way if repeated. A further advantage is that time and complexity can be reduced when updating existing chemical separation systems in the field, as all new ICs can be generated at one time for all customers that requires an update. A further advantage is that time and complexity can be reduced when performing test run of customer configurations.

According to a second aspect of the invention, the above mentioned and other objectives are achieved by a configuration system, the system comprising circuitry comprising a processing circuitry, and a memory, said memory comprising instructions executable by said processing circuitry, wherein the configuration system is communicatively coupled to fluid manipulation modules of a chemical separation system, whereby said system is configured to perform the method according to any of the preceding claims when the instructions are executed by said processing circuitry.

In one embodiment according to the second aspect, the configuration system is further communicatively coupled to a database, the database configured to store identities of function blocks in a set of function blocks and storing version identity of said function blocks in the set of function blocks and storing identity of the fluid manipulation modules, to which each function block of the set of function blocks is associated to.

In one embodiment according to the second aspect the database is further configured to store identities of chemical separation systems to where each function block of the set of function blocks has been installed.

According to a third aspect of the invention, the above mentioned and other objectives are achieved by a computer program comprising computer-executable instructions for causing a control unit, when the computer-executable instructions are executed on processing circuitry comprised in the control unit, to perform the method according to the first aspect.

According to a fourth aspect of the invention, the above mentioned and other objectives are achieved by a computer program product comprising a computer-readable storage medium, the computer-readable storage medium having the computer program according to the third aspect embodied therein.

Advantages of the disclosure according to the second to fourth aspect is at least the same as for the first aspect. A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

BRIEF DESCRIPTION OF THE DRAWINGS

FIG. 2 illustrates details of the chemical separation system according to one or more embodiments of the present disclosure.

FIG. 5 shows a flowchart of a method according to one or more embodiments of the present disclosure.

Figure 1:
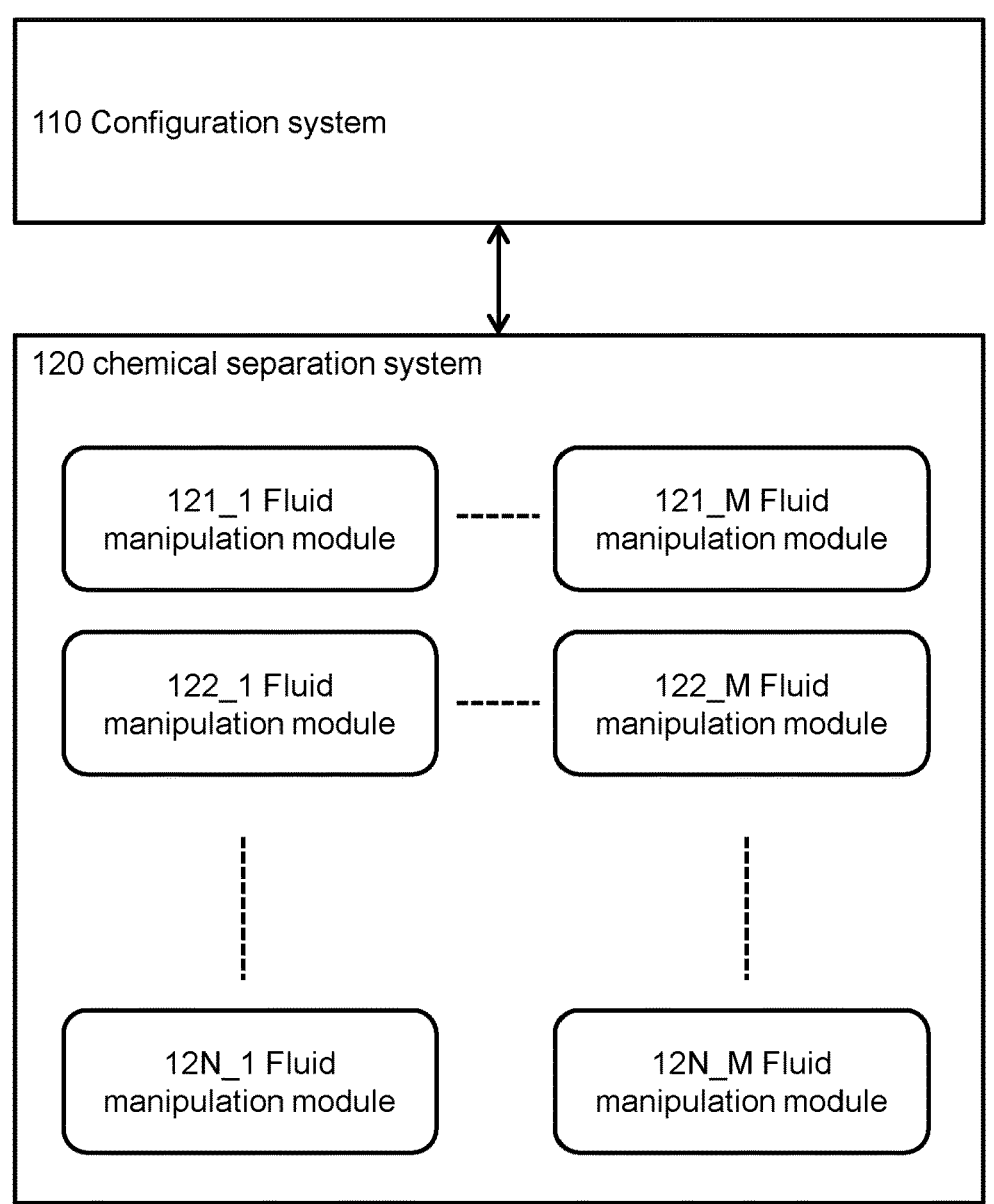
FIG. 1 illustrates a configuration system operable to configure a chemical separation system for chemical separation according to one or more embodiments of the present disclosure.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

The present disclosure relates to devices or systems for chemical separation. Such systems are typically formed or designed from a selection of a large number of fluid manipulation modules, which are selected based on the desired target substance achieved by the chemical separation. An example of such a chemical separation device/system is the Cytiva AKTA® chromatography apparatus.

A large selection of available fluid manipulation modules results in an enormously large number of possible combinations. To address this complexity, expert systems are typically used to guide a user to a selection of suitable and compatible fluid manipulation modules.

Given a particular selected combination of fluid manipulation modules, the desired functionality a user wants from that selected combination, and functionality that that selected combination is capable to support still varies greatly.

In conventional solutions, this has been addressed by loading software that enables all of functionality that that selected combination is capable to support. This means that there is "dead code" in the system, that never will be used unless a software bug accidently addresses the dead code.

The present solution solves this problem by identifying function blocks required only to provide the indicated fluid manipulation modules with the desired functionality.

Further, the present disclosure saves the identity and version of theses identified function blocks to a database together with an identity of the device/system. This enables improved efficiency, e.g., when software bugs are identified in function blocks or when function blocks are updated. Devices/systems with a particular function block can then be identified and updated.

At least one advantage of the present disclosure is that complexity of selecting software for a device/system for chemical separation can be reduced. A further advantage is that the operational safety can be improved by eliminating dead code. A further advantage is that complexity of updating/maintaining software for a device/system for chemical separation can be reduced.

An "or" in this description and the corresponding claims is to be understood as a mathematical OR which covers "and" and "or," and is not to be understand as an XOR (exclusive OR). The indefinite article "a" in this disclosure and claims is not limited to "one" and can also be understood as "one or more," i.e., plural.

In the present disclosure reference will be made interchangeably to processing circuitry and processing means.

In the present disclosure the term "fluid manipulation modules" denotes components, parts or material forming a chemical separation system, such as a chromatography apparatus.

In the present disclosure the term "fluid network" denotes components configured to allow fluid to flow through them and thereby fluidly connect fluid manipulation modules, input ports, output ports and any external components fluidly coupled to any of the fluid manipulation modules. Examples of such components are connectors, conduits, or tubes.

In the present disclosure the term "system hardware configuration data" or "configuration data" denotes data indicative of a configuration of a chemical separation system. The configuration data typically indicates modules included in the chemical separation system, desired functionality of the modules included in the chemical separation system and a fluid network fluidly connecting the modules.

In the present disclosure the term "function block" denotes software blocks, typically defining a function between input and output variables, such as IEC 61131-3 function blocks.

In the present disclosure the term "target molecule" denotes a desired molecule, typically a molecule separated in a liquid chromatographic process.

In the present disclosure the term "target substance" denotes a desired substance, typically a substance separated in a liquid chromatographic process.

In the present disclosure the term "chromatography" or "liquid chromatography" denotes a process for separating components of a mixture. The mixture is dissolved in a first substance called the mobile phase. The mixture and first substance are fed to an inlet of a chromatography column filled with a second substance called the stationary phase. The different components of the mixture travel through the stationary phase at different speeds, thereby causing them to separate from one another at the outlet of the chromatography column. The characteristics of the specific mobile and stationary phases determines which substances travel more quickly or slowly, and how well they are separated. These different travel times are termed retention time and is recorded as retention data.

In the present disclosure the term "chromatography run" denotes a cycle where the mixture and first substance travel from the inlet to the outlet of the chromatography column.

In the present disclosure the term "operation mode" defines the chromatography run characteristics. E.g., characteristics of the chromatography column, characteristics of beads/microporous volumes, characteristics of the mobile phase, characteristics of the stationary phase and characteristics of the mixture. This may include mobile phase modifiers such as pH, salt concentration and ionic strength, which may vary during the chromatography run.

In the present disclosure the term "retention behavior" and "retention behavior data" denotes the behavior of the mixture and first substance travelling through the chromatography column and the data recorded of that behavior. The retention behavior data may further comprise the chromatography run characteristics defined above. The retention behavior data may further comprise processed or aggregated data based on the above-mentioned categories of data. In one example, retention behavior data comprises travel time of components of the mixture from the inlet of the chromatography column to the outlet of the chromatography column. In one further example, retention behavior data comprises run volume or the total volume of the mixture and the mobile phase.

In the present disclosure the term "a fluid network" denotes fluidly coupled device/system components, typically configured to hold fluids, direct fluids, and control flow of fluids. Examples of device components comprise in a fluid network are conduits/pipes, fluid containers/receptacles, sensors, valves, fluid columns etc.

Some device components may be controllable and are communicatively coupled to a control unit and reacts to control signals received from the control unit and/or send data, e.g., device component characteristics and/or measurement data, as control signals to the control unit. Examples of such controllable device components are sensors and controllable valves.

FIG. 1 illustrates a configuration system 110 operable to configure a chemical separation system 120 for chemical separation according to one or more embodiments of the present disclosure. The chemical separation system 120 may e.g., be a chemical separation device such as a chromatography device.

The chemical separation system 120 comprises a plurality of fluid manipulation modules 121_1-12N_M fluidly coupled by a fluid network, e.g., comprising conduits and/or pipes.

The configuration system 110 has at a previous point in time received or defined the configuration of the fluid manipulation modules 121_1-12N_M fluidly and the fluid network as system hardware configuration data. In other words, data indicative of the configuration of the chemical separation system 120.

The system hardware configuration data is at least indicative of fluid manipulation modules (121_1-12N_M) of the chemical separation system 120. The system hardware configuration data is further indicative of desired functionality of the fluid manipulation modules and the fluid network. The fluid network comprises fluid couplers configured to fluidly couple the fluid manipulation modules (121_1-12N_M) internally or externally to the chemical separation system.

The configuration system 110 then identifies a first set of function blocks to provide the indicated fluid manipulation modules with the desired functionality. In one example, the configuration system 110 identifies the first set of function blocks by referencing a database using identities or type information of the fluid manipulation modules 121_1-12N_M and/or fluid network.

In one example, the fluid manipulation modules comprise a controllable valve and a controllable pump (not shown). Identifying the first set of function blocks to provide the indicated fluid manipulation modules with the desired functionality typically comprises retrieving all function blocks associated to the identity or type of the controllable valve and a controllable pump. The desired functionality may comprise to open valve and activate the pump in a fixed flow mode in response to a signal, e.g., a control signal from a control panel.

The configuration system 110 then generates a second set of function blocks by purging a third set of function blocks from the first set of function blocks to eliminate dead code using the configuration data.

In one example, the function blocks associated to the pump in the first set of function blocks may include a first function block for fixed flow and a second function block for variable flow. The second function block may then be added to the third set of function blocks and effectively be purged, as the desired functionality does not include variable flow operation.

The configuration system 110 then sends the second set of function blocks to the chemical separation system 120. In practical circumstances, this may include to load function blocks of the second set of function blocks into a corresponding control unit of the fluid manipulation modules.

FIG. 2 illustrates details of the chemical separation system 120 according to one or more embodiments of the present disclosure. The chemical separation system 120 comprises selected fluid manipulation modules 121_1-12N_M and/or a fluid network 210 fluidly coupling the fluid manipulation modules 121_1-12N_M to each other, to input/output ports and other external modules such as a chromatography column.

The chemical separation system 120 optionally comprises a central control unit 220 having a selection of the second set of function blocks, described in FIG. 1, loaded into memory.

Further, the selected fluid manipulation modules 121_1-12N_M each optionally comprises a respective control unit 221_1-22N_M each having a selection of the second set of function blocks, described in FIG. 1, loaded into memory.

Figure 3:
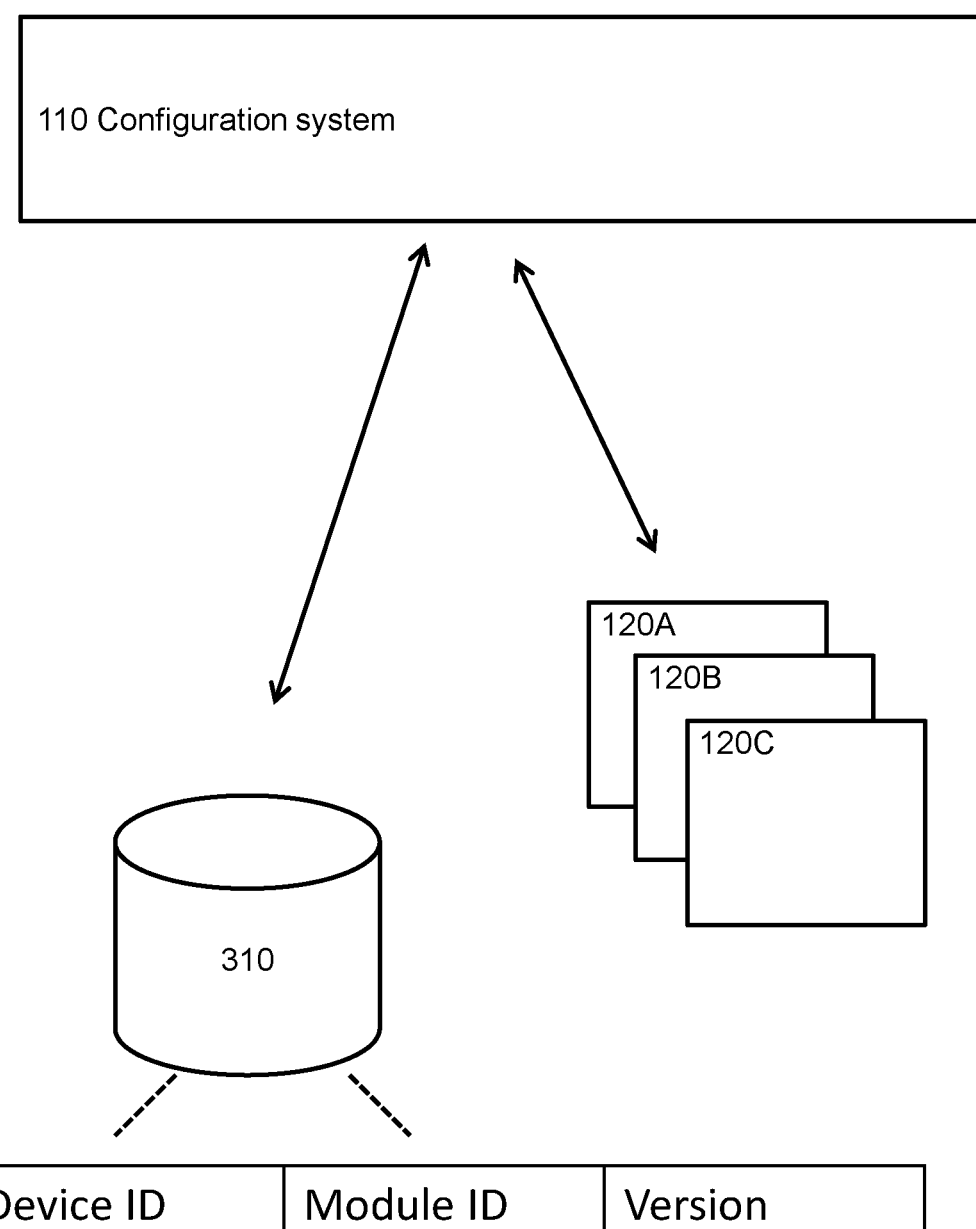
FIG. 3 illustrates storing of the second set of function blocks in a database according to one or more embodiments of the present disclosure.

FIG. 3 illustrates storing of the second set of function blocks in a database 310 according to one or more embodiments of the present disclosure. The configuration system 110 may generate a second set of function blocks for three different chemical separation systems 102A-120C.

The configuration system 110 may then save the corresponding set of function blocks together with further metadata, such as system identity, Module identity and function block version identity.

As can be seen from FIG. 3, this enables identification of device 120B as having an outdated version 3.1 of a function block 121_1, which can then be updated to version 3.2.

Figure 4:
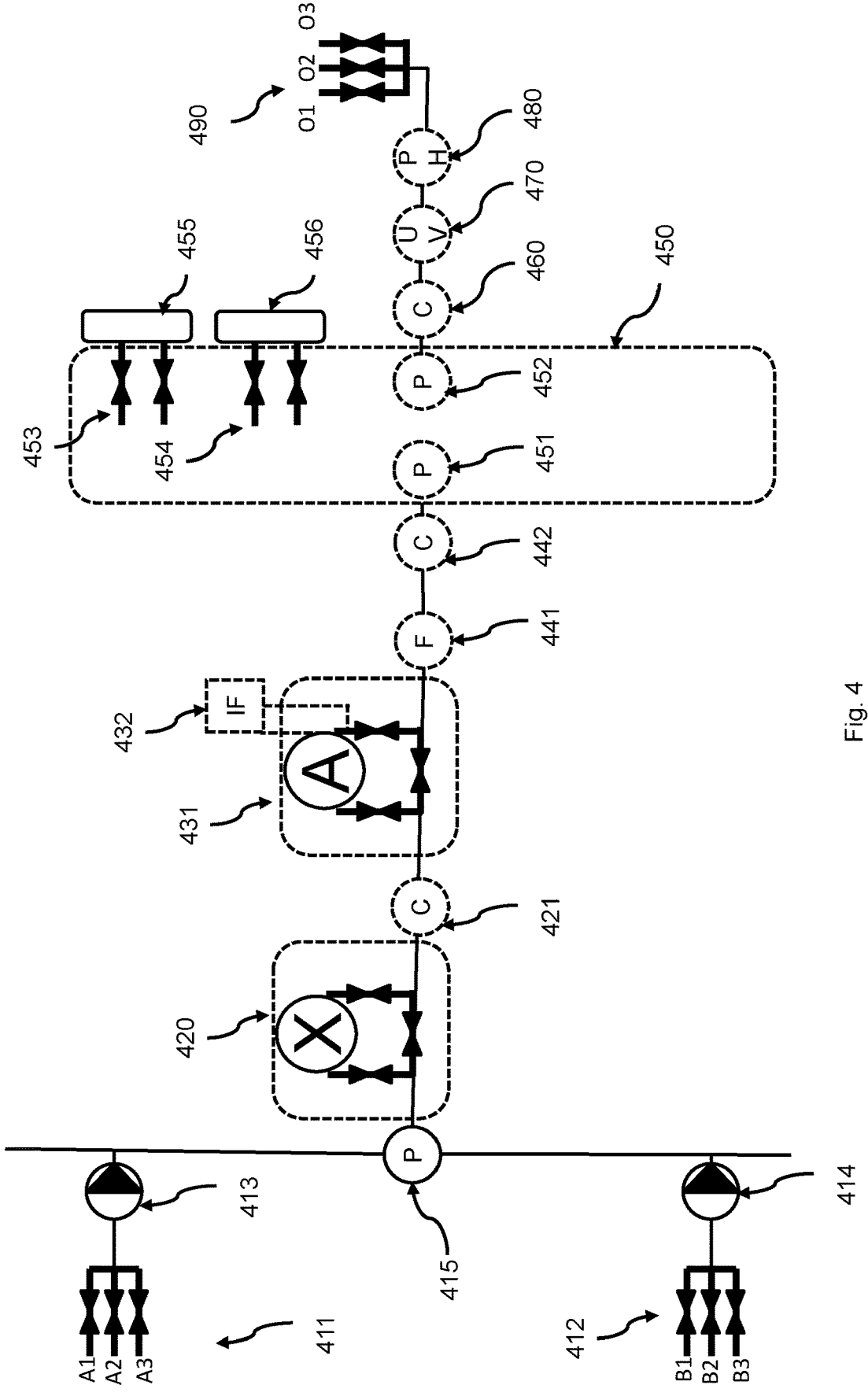
FIG. 4 illustrates an example of a configuration of a chemical separation system according to one or more embodiments of the present disclosure.

FIG. 4 illustrates an example of a configuration of a chemical separation system 120 according to one or more embodiments of the present disclosure. The configuration comprises a first input port module 411 and a second input port module 412, each port configured to allow fluid to flow or not allow fluid to flow from a one or more inlets A1-A3, B1-B3 by actuating controllable valves. A fluid network then fluidly couples the first input port 411 and the second input port 412 to a pressure sensor 415. The pressure sensor 415 is optionally then fluidly coupled to a mixer module 420 configured to mix incoming fluid. The mixer module 420 is then optionally coupled to an air-trap module 431 configured to remove air from incoming fluid, either directly or via a conductivity sensor module 421. The air-trap module 431 is then coupled to a column module 450 configured to control flow to/from columns 455, 456. The column module 450 optionally comprising pressure sensors 451, 452 and controllable column valves 453, 454, either directly or via a flow sensor and/or a conductivity sensor. The column module 450 is then fluidly coupled to one or more output port modules 490 configured each to allow fluid to flow or not allow fluid to flow from a one or more outlets O1-O3 by controlling controllable valves.

The chemical separation system 120 further comprises selections of sensors, such as pressure sensors P, conductivity sensors C, flow sensors F, Ultraviolet sensors UV and pH sensors pH.

The first input port module 411, second input port module 412, mixer module 420, air-trap module 431, column module 450 and output port module 490 typically comprises circuitry including a processor configured to execute function blocks to deliver functionality. The functionality partially depends on the combination of fluid manipulation modules, and thus the software required to deliver desired functionality varies with the combination of fluid manipulation modules.

In one example, addition of a fluid manipulation modules in the form of a pump and a conductivity sensor enables performing chemical separation with a gradient based on conductivity. I.e., the functionality associated with a particular fluid manipulation module is in part dependent on the selection of further fluid manipulation modules.

As the functionality of fluid manipulation modules varies with the configuration of the chemical separation system 120, all function blocks needed to support all functionality of the fluid manipulation modules is typically retrieved from a database configured to associate fluid manipulation modules to function blocks. Effectively, this includes a relatively large amount of dead code. The dead code may accidently be addressed by a software bug and introduces a risk to the chemical separation system 120.

The method disclosed herein addresses this problem.

FIG. 5 shows a flowchart of a method according to one or more embodiments of the present disclosure. The method performed by a configuration system 110 operable to configure a chemical separation system 120. The method comprises:

Step 510: receiving system hardware configuration data, wherein the system hardware configuration data is at least indicative of fluid manipulation modules 121_1-12N_M of the chemical separation system 120, desired functionality of the fluid manipulation modules, and a fluid network 210 comprising fluid couplers configured to fluidly couple the fluid manipulation modules 121_1-12N_M.

Step 520: identifying a first set of function blocks to provide the indicated fluid manipulation modules with the desired functionality.

In one example, identifying the first set of function blocks to provide the indicated fluid manipulation modules with the desired functionality typically comprises retrieving all function blocks associated to the identity or type of the fluid manipulation modules 121_1-12N_M of the chemical separation system 120 from a database linking identity or type of the fluid manipulation modules 121_1-12N_M to fluid manipulation modules.

Step 530: generating a second set of function blocks by purging a third set of function blocks from the first set of function blocks to eliminate dead code using the configuration data.

Generating the second set of function blocks typically comprises mapping desired functionality indicated by the system hardware configuration data to the first set of function blocks and identifying function blocks, typically supporting functionality not needed to deliver/provide the desired functionality, as the third set of function blocks. Purging function blocks is further described in relation to FIG. 1. In other words, the disclosure maps the desired functionality to function blocks using a predetermined database and then removes function blocks supporting functionality not needed to deliver/provide the desired functionality. In this manner, superfluous function blocks are removed and the amount of "dead code" is minimized or reduced.

Step 540: sending the second set of function blocks to the chemical separation system 120.

The second set of function blocks can typically be sent to the second set of function blocks via a communications network.

In one embodiment, generating the second set of function blocks comprises mapping the desired functionality to respective function blocks comprised in the first set of function blocks, identifying the third set of function blocks as blocks comprised in the first set of function blocks that have not been mapped to the desired functionality.

In one embodiment, the method further comprises storing data related to the chemical separation system 120 by storing identity of the chemical separation system 120, storing identities of function blocks in the second set of function blocks, and storing version identity of said function blocks in the second set of function blocks, and storing identity of the fluid manipulation modules 121_1-12N_M, to which each function block of the second set of function blocks is associated to, in a database. This is further described in relation to FIG. 3.

This has at least the advantage to reduce complexity when updating software of existing chemical separation systems 120, as function blocks as well as software versions of function blocks can easily be mapped to specific chemical separation systems 120 already installed.

In one embodiment, the function blocks are function blocks defined by the IEC 61131-3 standard.

In one embodiment, the system hardware configuration data is indicative of fluid manipulation modules selected from one or more of an inlet port module 411, 412, a system pump module 413, 414, a pressure sensor module 415, 451, 452, a mixer module 420, an air trap module 431, a conductivity module 440, 460, a column module 450, an UV module 470, a pH module 489 and an outlet module 490.

It is understood that any number of instances of fluid manipulation modules may be indicated without departing from the present disclosure. It is further understood that the teaching herein can be extended to any number of different fluid manipulation modules known in the art without departing from the present disclosure.

In one embodiment, the system hardware configuration data is at least indicative of a flow scheme for directing fluids to and from the system 120 and for operating said fluid manipulation modules 121_1-12N_M of the chemical separation system 120 according to a selected protocol or method.

In a further aspect of the disclosure, a configuration system 110 is provided.

Figure 6:
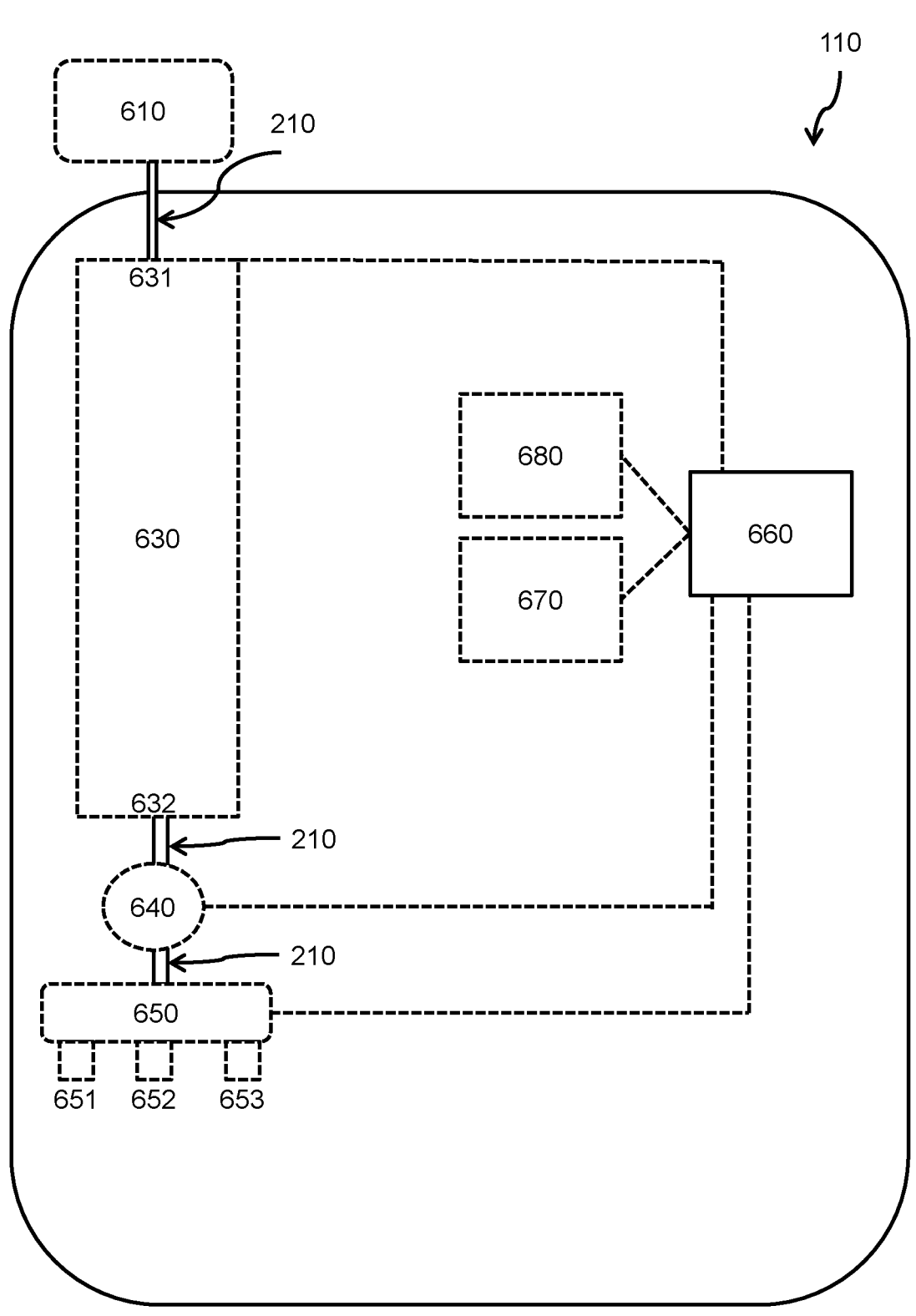
FIG. 6 illustrates a configuration system according to one or more embodiments of the present disclosure.

FIG. 6 illustrates a configuration system 110 according to one or more embodiments of the present disclosure. The configuration system 110 comprises:

circuitry 660 comprising:

a processing circuitry, and a memory, said memory comprising instructions executable by said processing circuitry, wherein the configuration system 110 is communicatively coupled to fluid manipulation modules 121_1-12N_M of a chemical separation system 120, whereby said system is configured to perform the method described herein when the instructions are executed by said processing circuitry.

In one embodiment, the configuration system 110 is further communicatively coupled to a database 310. The database 310 is configured to store identities of function blocks in a set of function blocks and storing version identity of said function blocks in the set of function blocks and storing identity of the fluid manipulation modules 121_1-12N_M, to which each function block of the set of function blocks is associated to.

Additionally, or alternatively, the database 310 is further configured to store identities of chemical separation systems 120 to where each function block of the set of function blocks has been installed.

In a further aspect of the disclosure, a computer program is provided and comprises computer-executable instructions for causing a control unit, when the computer-executable instructions are executed on processing circuitry comprised in the control unit, to perform any of the method steps described herein.

In a further aspect of the disclosure, a computer program product is provided comprising a computer-readable storage medium, the computer-readable storage medium having the computer program above embodied therein.

In FIG. 6 the configuration system 110 comprise a control unit 660 which comprises circuitry, e.g., a processor and a memory. The memory may contain instructions executable by the processor, whereby said device is operative to perform any of the steps or methods described herein. The control unit 660 may comprise a single control unit or a one or more distributed control units cooperating to perform the method herein.

Additionally, or alternatively, the chemical separation system 120 may further comprise a controllable fluid network 210, e.g., comprising fluidly coupled pipes or conduits.

Additionally, or alternatively, the device may further comprise a chromatography column 630 further comprising at least one fluid inlet 631 and one fluid outlet 632. The fluid inlet 631 and one fluid outlet 632 are typically fluidly coupled to the controllable fluid network 210.

The chemical separation system 120 may further optionally comprise the fraction collection unit 650. The fraction collection unit 650 is typically fluidly coupled to the controllable fluid network.

Additionally, or alternatively, the chemical separation system 120 further comprises a display 680.

Additionally, or alternatively, the chemical separation system 120 further comprises an input device 670.

In one embodiment, the device further comprises one or more sensors (not shown) configured to measure characteristics of the fluid in the chemical separation system 120 and/or the fluid network 210. The control unit 660 is further optionally communicatively coupled to each of the sensors. The sensors may be configured to pressure and/or measure pH and/or conductivity of fluids in the device. Any suitable sensor for performing measurements on fluids may be used.

The chemical separation system 120 may be in the form of e.g., a chromatography apparatus, an Electronic Control Unit, a server, an on-board computer, a stationary computing device, a laptop computer, a tablet computer, a handheld computer, a wrist-worn computer, a smart watch, a smartphone, or a smart TV. The chemical separation system 120 may comprise circuitry communicatively coupled to a transceiver configured for wired or wireless communication. The chemical separation system 120 may further comprise at least one optional antenna (not shown in figure). The antenna may be coupled to the transceiver and is configured to transmit and/or emit and/or receive wired or wireless signals in a communication network, such as Wi-Fi, Bluetooth, 3G, 4G, 5G etc. In one example, the processing circuitry may be any of a selection of processing circuitry and/or a central processing unit and/or processor modules and/or multiple processors configured to cooperate with each-other. Further, the chemical separation system 120 may further comprise a memory. The memory may e.g., comprise a selection of a hard RAM, disk drive, a floppy disk drive, a flash drive or other removable or fixed media drive or any other suitable memory known in the art. The memory may contain instructions executable by the processing circuitry to perform any of the steps or methods described herein. The processing circuitry may optionally be communicatively coupled to a selection of any of the transceiver the memory, one or more sensors, such as pH sensors, conductivity sensors and pressure sensors or any suitable type of sensor capable of measuring characteristics of the device and/or fluids processed by the device. The chemical separation system 120 may be configured to send/receive control signals directly to any of the above-mentioned units or to external nodes or to send/receive control signals via the wired and/or wireless communications network.

The wired/wireless transceiver and/or a wired/wireless communications network adapter may be configured to send and/or receive data values or parameters as a signal to or from the processing circuitry to or from other external nodes. E.g., measured pH or conductivity or generated volume of the buffer solution.

In an embodiment, the transceiver communicates directly to external nodes or via the wireless communications network.

In one or more embodiments, the input device 670 is configured to receive input or indications from a user and send a user input signal indicative of the user input or indications to the processing circuitry.

In one or more embodiments, the display 680 is configured to receive a display signal indicative of rendered objects, such as text or graphical user input objects, from the processing circuitry and to display the received signal as objects, such as text or graphical user input objects.

In one embodiment the display 680 is integrated with the user input device 670 and is configured to receive a display signal indicative of rendered objects, such as text or graphical user input objects, from the processing circuitry and to display the received signal as objects, such as text or graphical user input objects, and/or configured to receive input or indications from a user and send a user-input signal indicative of the user input or indications to the processing circuitry.

In a further embodiment, the chemical separation system 120 may further comprise and/or be coupled to one or more additional sensors (not shown in the figure) configured to receive and/or obtain and/or measure physical properties pertaining to the device/system and/or or an atmosphere surrounding the device/system and send one or more sensor signals indicative of the physical properties of the device to the processing circuitry. E.g., a temperature sensor measuring ambient air temperature.

In embodiments, the communications network communicate using wired or wireless communication techniques that may include at least one of a Local Area Network (LAN), Metropolitan Area Network (MAN), Global System for Mobile Network (GSM), Enhanced Data GSM Environment (EDGE), Universal Mobile Telecommunications System, Long term evolution, High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, Wireless MAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (Wi-MAX) and ultrasonic communication, etc., but is not limited thereto.

Moreover, it is realized by the skilled person that the chemical separation system 120 may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processing circuitry and/or processing means of the present disclosure may comprise one or more instances of processing circuitry, processor modules and multiple processors configured to cooperate with each-other, Central Processing Unit (CPU), a processing unit, a processing circuit, a processor, an Application Specific Integrated Circuit (ASIC), a microprocessor, a Field-Programmable Gate Array (FPGA) or other processing logic that may interpret and execute instructions. The expression "processing circuitry" and/or "processing means" may thus represent a processing circuitry comprising a plurality of processing circuits, such as, e.g., any, some, or all the ones mentioned above. The processing means may further perform data processing functions for inputting, outputting, and processing of data comprising data buffering and device control functions, such as user interface control, or the like.

Figure 7:
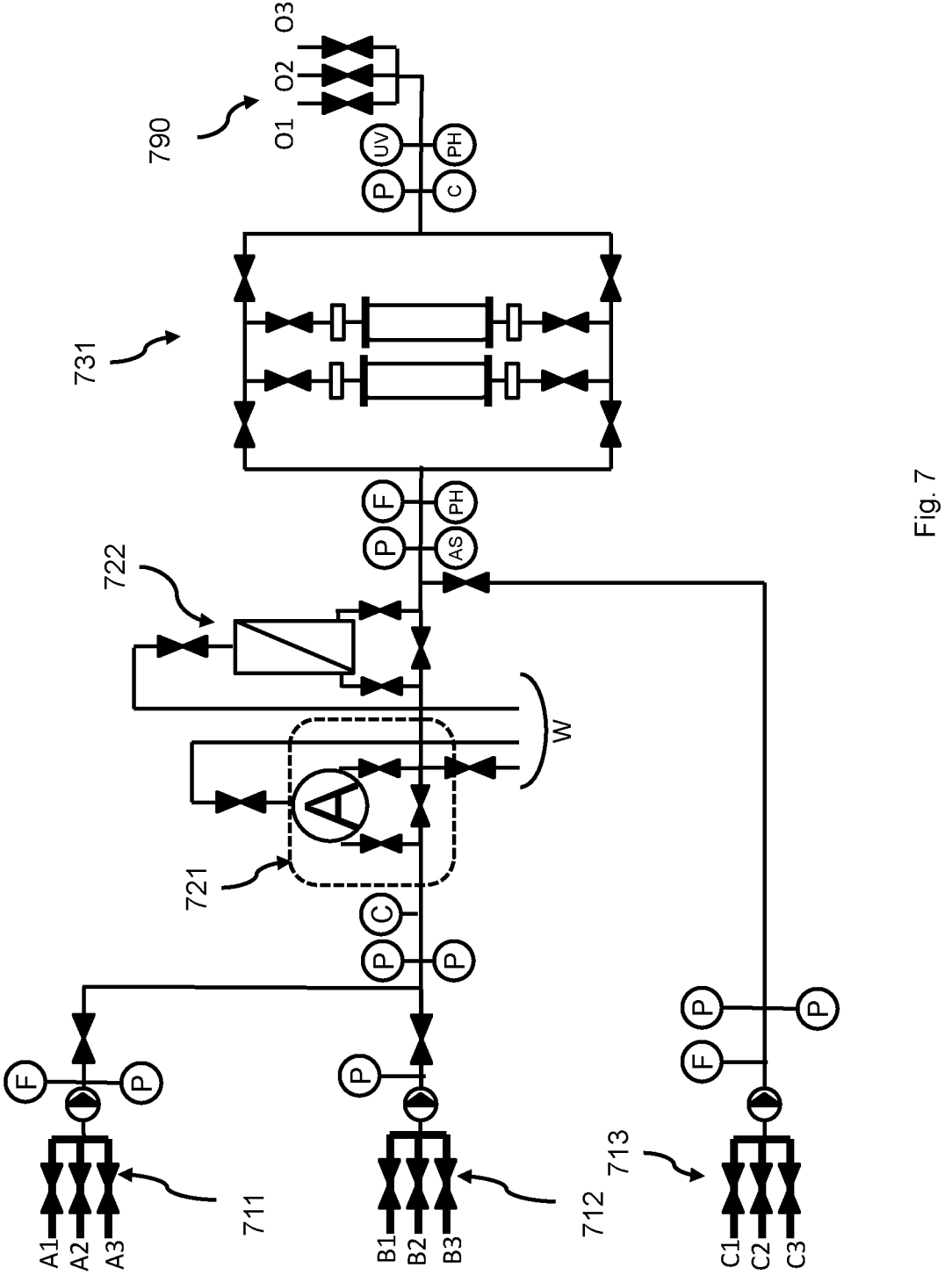
FIG. 7 illustrates a further example of a configuration of a chemical separation system according to one or more embodiments of the present disclosure.

FIG. 7 illustrates a further example of a configuration of a chemical separation system 120 according to one or more embodiments of the present disclosure. This particular example illustrates a flow path illustration for ÄKTA process with single filter and feed pump C options.

The configuration comprises a first, second and third input port modules 711-713. This configuration further comprises an air-trap module 721, a column module 731 and an output port module 790. These modules and sensors P, F, AS, pH, UV are further described in relation to FIG. 4. This configuration further comprises a single filter 722.

Figure 8:
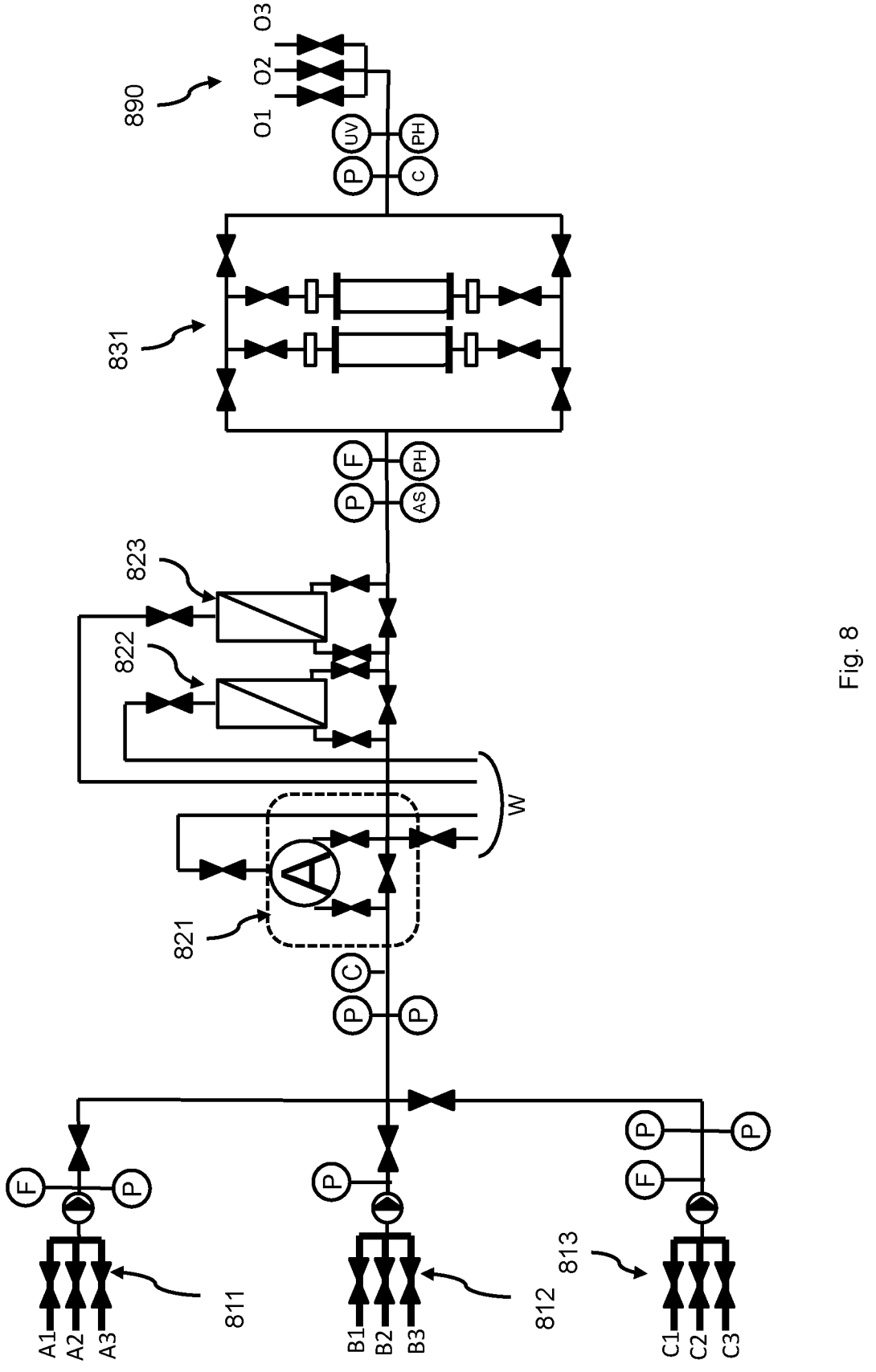
FIG. 8 illustrates a further example of a configuration of a chemical separation system according to one or more embodiments of the present disclosure.

FIG. 8 illustrates a further example of a configuration of a chemical separation system 120 according to one or more embodiments of the present disclosure. This particular example illustrates a flow path illustration for an ÄKTA process with two filters and ILD pump C options.

The configuration comprises a first, second and third input port modules 811-813. This configuration further comprises an air-trap module 821, a column module 831 and an output port module 890. These modules and sensors P, F, AS, pH, UV are further described in relation to FIG. 4. This configuration further comprises two filters 822, 823.

Finally, it should be understood that the invention is not limited to the embodiments described above, but also relates to and incorporates all embodiments within the scope of the appended independent claims.

The invention claimed is:

1. A method performed by a configuration system operable to configure a chemical separation system for execution of one or more chemical separation processes, the method comprising:

receiving system hardware configuration data from the configuration system, wherein the system hardware configuration data is at least indicative of fluid manipulation modules of the chemical separation system, desired functionality of the fluid manipulation modules, and a fluid network comprising fluid couplers configured to fluidly couple the fluid manipulation modules, identifying a first set of function blocks to provide the indicated fluid manipulation modules with the desired functionality, generating a second set of function blocks by purging a third set of function blocks from the first set of function blocks to eliminate dead code using the configuration data, and sending the second set of function blocks to the chemical separation system, wherein the configuration system comprises a processing circuitry and a memory comprising instructions executable by said processing system, and wherein the configuration system is communicatively coupled to the fluid manipulation modules via the processing circuitry to provide the fluid manipulation modules with the desired functionality from the configuration system for execution of one or more chemical separation processes, via the chemical separation system.

2. The method according to claim 1, wherein generating the second set of function blocks comprises:

mapping the desired functionality to respective function blocks comprised in the first set of function blocks, and identifying the third set of function blocks as blocks comprised in the first set of function blocks that have not been mapped to the desired functionality.

3. The method according to claim 1, wherein the method further comprises storing data related to the chemical separation system by storing identities of the chemical separation system, storing identities of function blocks in the second set of function blocks, storing version identity of said function blocks in the second set of function blocks and storing identity of the fluid manipulation modules, to which each function block of the second set of function blocks is associated to, in a database.

4. The method according to claim 1, wherein the function blocks are function blocks defined by the IEC 61131-3 standard.

5. The method according to claim 1, wherein the system hardware configuration data is indicative of fluid manipulation modules selected from one or more of an inlet port module, a system pump module, a pressure sensor module, a mixer module, an air trap module, a conductivity module, a column module, an UV module, a pH module and an outlet module.

6. The method according to claim 1, wherein the system hardware configuration data is at least indicative of a flow scheme for directing fluids to and from the system and for operating said fluid manipulation modules of the system according to a selected protocol.

* * * * *